(12) United States Patent
Thornsberry et al.

(10) Patent No.: US 6,866,923 B2
(45) Date of Patent: Mar. 15, 2005

(54) THERMOSETTING PLASTIC FOAMS AND METHODS OF PRODUCTION THEREOF USING ADHESION ADDITIVES

(75) Inventors: James D. Thornsberry, Meridian, MS (US); Gregory Islas, Meridian, MS (US); Robert H. Blanpied, Meridian, MS (US)

(73) Assignee: Atlas Roofing Corporation, Meridian, MS (US)

( * ) Notice: Subject to any disclaimer, the term of this patent is extended or adjusted under 35 U.S.C. 154(b) by 9 days.

(21) Appl. No.: 09/987,693

(22) Filed: Nov. 15, 2001

(65) Prior Publication Data

US 2002/0090503 A1 Jul. 11, 2002

Related U.S. Application Data

(60) Provisional application No. 60/248,202, filed on Nov. 15, 2000.

(51) Int. Cl.[7] .............................. B32B 3/26; B32B 27/00; B32B 9/00
(52) U.S. Cl. ................................. 428/304.4; 428/314.4; 428/318.4; 428/318.6; 428/319.3; 428/319.7
(58) Field of Search ........................... 428/304.4, 319.3, 428/319.7, 314.4, 318.4, 318.6

(56) References Cited

U.S. PATENT DOCUMENTS

| | | |
|---|---|---|
| 3,558,531 A | 1/1971 | Salyer et al. |
| 3,993,609 A | 11/1976 | Kamens et al. |
| 4,335,218 A * | 6/1982 | DeGuiseppi ............... 521/99 |
| 4,636,529 A | 1/1987 | Croker |
| 4,898,893 A | 2/1990 | Ashida |
| 4,927,863 A | 5/1990 | Bartlett et al. |
| 4,931,119 A | 6/1990 | Watkins |
| 4,972,003 A | 11/1990 | Brünbauer et al. |
| 4,981,876 A | 1/1991 | Grimmer |
| 4,981,880 A | 1/1991 | Lehmann et al. |
| 4,986,930 A | 1/1991 | Lund et al. |
| 4,996,242 A | 2/1991 | Lin |
| 5,032,623 A | 7/1991 | Keske et al. |
| 5,034,424 A | 7/1991 | Wenning et al. |
| 5,057,547 A | 10/1991 | Doerge |
| 5,070,113 A | 12/1991 | Omure et al. |
| 5,093,377 A | 3/1992 | Bartlett et al. |
| 5,096,933 A | 3/1992 | Volkert |
| 5,102,919 A | 4/1992 | Swab |
| 5,102,920 A | 4/1992 | Doerge et al. |
| 5,114,985 A | 5/1992 | Kuyzin et al. |
| 5,114,986 A | 5/1992 | Lin |
| 5,130,345 A | 7/1992 | Li et al. |
| 5,154,419 A | 10/1992 | Madhavan |
| 5,166,182 A | 11/1992 | Blanpied |
| 5,169,873 A | 12/1992 | Behme et al. |
| 5,182,309 A | 1/1993 | Hützen |
| 5,205,956 A | 4/1993 | Volkert et al. |
| 5,213,707 A | 5/1993 | Swan et al. |
| 5,227,088 A | 7/1993 | Swan et al. |
| 5,234,967 A | 8/1993 | Takezawa et al. |
| 5,236,611 A | 8/1993 | Shiflett |
| 5,248,433 A | 9/1993 | Felix et al. |
| 5,252,625 A | 10/1993 | McLaughlin et al. |
| 5,254,600 A | 10/1993 | Blanpied et al. |
| 5,254,601 A | 10/1993 | Doerge |
| 5,262,077 A | 11/1993 | Bivens et al. |
| 5,272,183 A | 12/1993 | Doerge |
| 5,277,834 A | 1/1994 | Bivens et al. |
| 5,278,196 A | 1/1994 | Robin et al. |
| 5,283,003 A | 2/1994 | Chen |
| 5,290,823 A | 3/1994 | Volkert |
| 5,294,647 A | 3/1994 | Blanpied et al. |
| 5,296,516 A | 3/1994 | Krueger et al. |
| 5,304,320 A | 4/1994 | Barthélemy et al. |
| 5,314,926 A | 5/1994 | Robin et al. |
| 5,318,996 A | 6/1994 | Yu-Hallada et al. |
| 5,336,696 A | 8/1994 | Ashida |
| 5,367,000 A | 11/1994 | Wiedermann et al. |
| 5,426,127 A | 6/1995 | Doerge |
| 5,444,101 A | 8/1995 | De Vos et al. |
| 5,461,084 A | 10/1995 | Doerge |
| 5,519,065 A | 5/1996 | Vos et al. |
| 5,578,651 A | 11/1996 | Lamberts et al. |
| 5,601,753 A | 2/1997 | Omure et al. |
| 5,624,969 A | 4/1997 | Seifert et al. |
| 5,741,825 A | 4/1998 | Imagaki et al. |
| 5,840,212 A | 11/1998 | Doerge |
| 5,847,018 A | 12/1998 | Blanpied et al. |
| 5,866,626 A | 2/1999 | Blanpied et al. |
| 5,889,066 A | 3/1999 | Doerge |
| 5,907,014 A | 5/1999 | Quint |
| 5,962,542 A | 10/1999 | Dietrich et al. |

OTHER PUBLICATIONS

Klaassen, C., M. Amdur and J. Doull (eds.). *Casarett and Doull's Toxicology*, 5th Ed. Pergamon Press, NY. 1996.
Klaassen, C., M. Amdur and J. Doull (eds.). *The Basic Science of Poisons*, 5th Ed. Pergamon Press, NY. 1996.

* cited by examiner

*Primary Examiner*—Daniel Zirker
*Assistant Examiner*—Victor S. Chang
(74) *Attorney, Agent, or Firm*—Nixon & Vanderhye, P.C.

(57) ABSTRACT

A rigid closed cell polyisocyanate-based foams is created by reacting at least one organic polyisocyanate with compounds having at least two active hydrogen atoms in the presence of an n-pentane blowing agent. When the foam is formed into a laminated board with facers, the foam formulation includes a sufficient amount of a common blend of cleaning solvent chemicals to cause a noticeable improvement in facer adhesion. The chemicals used to improve facer adhesion are a standard blend of industrial cleaning solvents called "Di-Basic Esters" or DBE. The actual chemical compounds in one mode of this mixture are the methyl esters of about 59% glutaric acid, about 20% succinic acid, and about 21% adipic acid. The minimum rate of addition of the Di-Basic Esters"[DBE] thought to be effective may be less than about 0.5 parts per hundred parts of polyol (pphpp). The currently preferred embodiments use add-on rates within the range of about 0.5 to about 5.0 pphpp, with the currently most preferred range being from about 1.0 to about 3.0 pphpp. The blend of cleaning chemicals employed by the present invention surprisingly enhance the adhesion between the foam and the facer.

11 Claims, No Drawings

THERMOSETTING PLASTIC FOAMS AND METHODS OF PRODUCTION THEREOF USING ADHESION ADDITIVES

This application claims the priority and benefit of United States Provisional Patent Application Ser. No. 60/248,202, filed Nov. 15, 2000, which is incorporated by reference herein in its entirety.

BACKGROUND

1. Field of the Invention

The present invention pertains to laminated thermosetting foam board products and methods of making said products, utilizing a new and unique chemical agent to create a superior adhesion of the foam to a facer material.

2. Related Art and Other Considerations

Cellular organic plastic foams used for thermal insulation are well known in the art. Such foams can be made with urethane linkages, or made with a combination of both isocyanurate linkages and urethane linkages, or they can be made via the well known condensation reactions of formaldehyde with phenol, urea, and melamine. All such plastic foams must utilize an expansion agent, often referred to as a "blowing agent". Much has been written regarding the improvement of insulation values via utilization of unique blowing agents, or combinations of blowing agents. Several other methods to improve insulation values include better surfactants and chemical additives.

If higher levels of water are used to expand foam, the surface interface of the foam to the facer can become friable, resulting in facer delamination. In the past, ethylene and propylene carbonates have been used to reduce the problematic surface friability. However, other problems were encountered using carbonates; e.g., they hydrolyze into their respective glycols. Free glycols use up large quantities of isocyanates, making poor foam.

Most of the rigid foam insulation manufactured goes into the building construction trade. To meet building codes and building insurance requirements, flame retardant materials are often added to these foams. These additives are usually organic halogens or phosphates, or combinations of organic halogens with phosphate included. Another means to improve flame resistance comprises the use of highly aromatic chemicals, since aliphatic organics are more prone to be flammable. Other additives can reduce friability and improve the facer adhesion.

The prior art is replete with references to techniques of rendering thermosetting foams more flame resistant, having better physical strength, and improving k-factors. In recent years, all of these method and products thereof have been taught in such United States patents as the following (all of which are incorporated herein by reference):

| | | | |
|---|---|---|---|
| 3,558,531 | 3,993,609 | 4,636,529 | 4,898,893 |
| 4,927,863 | 4,931,119 | 4,972,003 | 4,981,876 |
| 4,981,880 | 4,986,930 | 4,996,242 | 5,032,623 |
| 5,034,424 | 5,057,547 | 5,070,113 | 5,093,377 |
| 5,096,933 | 5,102,919 | 5,102,920 | 5,114,985 |
| 5,114,986 | 5,130,345 | 5,164,419 | 5,166,182 |
| 5,169,873 | 5,182,309 | 5,205,956 | 5,213,707 |
| 5,227,088 | 5,234,967 | 5,236,611 | 5,248,433 |
| 5,254,601 | 5,262,077 | 5,272,183 | 5,277,834 |
| 5,278,196 | 5,283,003 | 5,290,823 | 5,296,516 |
| 5,304,320 | 5,314,926 | 5,318,996 | 5,336,696 |

-continued

| | | | |
|---|---|---|---|
| 5,367,000 | 5,426,127 | 5,444,101 | 5,461,084 |
| 5,519,065 | 5,578,651 | 5,601,753 | 5,624,969 |
| 5,741,825 | 5,840,212 | 5,847,018 | 5,866,626 |
| 5,889,066 | 5,907,014 | 5,962,542 | |

Three (3) of the above listed patents teach the use of a common blend of industrial cleaning solvents called "Di-Basic Esters" (DBE) in thermosetting plastics. U.S. Pat. No. 5,102,919 teaches that the use of DBE significantly reduces the smoke generated by a flame retarded polyurethane/polyisocyanurate foam. U.S. Pat. No. 5,907,014 teaches that DBE reduces viscosity and improves "wettability" in an elastomeric polyurethane solid. Adhesion is not mentioned in either U.S. Pat. No. 5,102,919 or U.S. Patent No. 5,907,014.

Another use for DBE as a cell-opening agent in a low density polyurethane foam appears in U.S. Pat. No. 5,114,985. Without explanation, U.S. Pat. No. 5,114,985 states that foam adhesion can be reduced by silicone surfactants. The foam examples 1–5 teach that other variables (such as amounts of water and types of polyols) affect adhesion, but there is no recognition whether DBE has an effect on adhesion. Example number 3 stuck to the mold probably because it contained a lower level of water. Water is notorious for reducing adhesion by causing friability. Comparing examples 4 and 5 indicate that DBE in number 4 did not show better adhesion than number 5 without DBE. Furthermore, example 4 compared to examples 1 and 2 implies DBE has no effect on adhesion.

For many years, the dominant blowing agent used to expand thermosetting plastics into cellular foam for use as insulation was trichlorofluoromethane (CFC-11). This product had all the characteristics needed for foam insulation, but was determined to be a threat to stratospheric ozone. After trichlorofluoromethane (and all the "CFCs") was phased out, the most common class of blowing agents became the hydrogenated chlorofluorocarbons (called "HCFCs"). These products are considered to be somewhat environmentally friendly expansion agents, but still contain some chlorine. However, the chlorine atoms of HCFCs are stable at altitudes under the stratosphere, so therefore they have a lower "Ozone Depleting Potential" (called "ODP"). But because they do have even a small ODP, the HCFCs have also been mandated for eventual phase out.

There is one chlorine containing molecule which the US EPA has approved for use as a blowing agent. This organic chloride is 2-chloropropane, $CH_3$—CHCl—$CH_3$. However, this substance is listed by the Environmental Defense Fund's (EDF's) Scorecard as a suspected health hazard. Two authoritative references on the subject are: Klaassen, C., M. Amdur and J. Doull (eds.). *Casarett and Doull's Toxicology*; and, *The Basic Science of Poisons*, 5th Ed. Pergamon Press, NY. 1996 (see Table 17-1: Cardiotoxicity of Key Pharmaceutical Agents, Table 17-2: Halogenated Hydrocarbons Reported to Have Arrhythimogenic Properties, Table 17-3: Cardiotoxicity of Selected Industrial Agents, Table 17-6: Vasculotoxic Agents: Heavy Metals, Table 17-7: Vasculotoxic Agents: Industrial and Environmental Agents, Table 17-8: Vasculotoxic Agents: Gases). This compound is listed as a suspected neurotoxicant and as a respiratory toxicant in the "National Institute for Occupational Safety and Health's (NIOSH's) Registry of Toxic Effects of Chemical Substances" (RTECS) (See EDF's Suspect Hazard Identification documentation).

Another known class of blowing agents is the non-chlorinated, partially hydrogenated fluorocarbons (called "HFCs") which have the general formula: $H_xF_yC_z$ where x, y, and z are integers. The HFC compounds that have been approved for use as future expansion agents are HFC-134a, HFC-152a, and HFC-245fa. Some of these three compounds are now being utilized by either the aerosol industry or the refrigeration industry. This utilization factor has reduced the cost of these compounds whereby it may be affordable to use them as a portion, but not all, of the total blowing agent package. In view of the fact that about ten percent by weight of rigid foam insulation can be the compounds used as blowing agents, the still relatively high cost of HFCs needs to be offset by other, lower cost, expansion agents.

The US Environmental Protection Agency ("EPA") refers to certain expansion agent compounds as "Saturated Light Hydrocarbons C3–C6". These compounds are propane, isobutane, n-butane, isopentane, n-pentane, cyclopentane, and the various isomers of hexane. However, it has been discovered that when utilizing n-pentane as the sole expansion agent for a foam, the surface of the foam becomes too friable. This surface friability results in poor adhesion to the facer of a laminated foam board product. Poor adhesion of the facer to the foam of a laminated foam board insulation is intolerable.

What is needed, therefore, and an object of the present invention, is a low-cost insulation foam utilizing a suitable blowing agent and also having acceptable surface adhesion.

BRIEF SUMMARY OF THE INVENTION

This invention relates to rigid closed cell polyisocyanate-based foams created by reacting at least one organic polyisocyanate with compounds having at least two active hydrogen atoms in the presence of n-pentane blowing agent. When the foam is formed into a laminated board with facers, the foam formulation includes a sufficient amount of a common blend of cleaning solvent chemicals to cause a noticeable improvement in facer adhesion.

The chemicals used to improve facer adhesion are a standard blend of industrial cleaning solvents called "Di-Basic Esters" or DBE. The actual chemical compounds employed in one mode of in this mixture are the methyl esters of about 59% glutaric acid, about 20% succinic acid, and about 21% adipic acid. The minimum rate of addition of the Di-Basic Esters" [DBE] thought to be effective may be less than about 0.5 parts per hundred parts of polyol (pphpp). The currently preferred embodiments use add-on rates within the range of about 0.5 to about 5.0 pphpp, with the currently most preferred range being from about 1.0 to about 3.0 pphpp.

Various common additives such as catalysts, cell size controlling silicone surfactants, flame retardant chemicals, and organic surfactants can be any of the ordinary products normally used by those experienced in the art of foam production.

DETAILED DESCRIPTION OF THE INVENTION

In the following description, for purposes of explanation and not limitation, specific details are set forth such as particular compositions, techniques, etc. in order to provide a thorough understanding of the present invention. However, it will be apparent to those skilled in the art that the present invention may be practiced in other embodiments that depart from these specific details. In other instances, detailed descriptions of well known substances and methods are omitted so as not to obscure the description of the present invention with unnecessary detail.

In accordance with the present invention, rigid closed cell polyisocyanate-based foams are created by reacting at least one organic polyisocyanate with compounds having at least two active hydrogen atoms in the presence of n-pentane blowing agent. When the foam is formed into a laminated board with facers, the foam formulation includes a sufficient amount of a common blend of cleaning chemicals to cause a noticeable improvement in facer adhesion. Various common additives such as catalysts, cell size controlling silicone surfactants, flame retardant chemicals, and organic surfactants can be any of the ordinary products normally used by those experienced in the art of foam production.

The chemicals used in accordance with the present invention to improve facer adhesion are a standard blend of industrial cleaning solvents called "Di-Basic Esters" or DBE. The actual chemical compounds employed in one mode in this mixture are the methyl esters of about 59% glutaric acid, about 20% succinic acid, and about 21% adipic acid. This particular mixture is used as an industrial cleaning-solvent, where it has successfully replaced many of the heavily chlorinated hydrocarbons that are being mandated out of use. The "Di-Basic Esters", or DBE, can be obtained from DuPont Nylon Specialty Intermediates, P.O. Box 1089, Orange, Tex.

For whatever reason, usage of normal-pentane blown foams requires greater effort to reduce surface friability than would appear to be the case with any of the other EPA approved Saturated Light Hydrocarbons C3–C6. However, when "Di-Basic Esters" (DBE) were added to a foam formula as a potential plasticizer in accordance with the present invention, it was discovered that the foam's adhesion to the board facer improved, as demonstrated below.

The minimum rate of addition of the Di-Basic Esters" [DBE] thought to be effective may be less than about 0.5 parts per hundred parts of polyol (pphpp). The currently preferred embodiments use add-on rates within the range of about 0.5 to about 5.0 pphpp, with the currently most preferred range being from about 1.0 to about 3.0 pphpp.

The discovery is below described by showing examples of amounts used and the resulting peel-strength test results. Actual manufacturing line boards were produced and tested for facer adhesion by a common peel-strength test, outlined below.

EXAMPLES 1, 2, 3, AND 4

Table 1 shows four example foam formulations, each example being in a different column in Table 1. It should be understood that the foam formulation examples of Table 1 can be in the context of conventional practice which involves both an "A-Blend" and a "B-Blend". In Table 1, the units of the first row (polyol) is parts by weight (pbw). The units of the second through ninth rows are in parts per hundred parts of polyol (pphpp).

A prior art foam formulation using n-pentane as the only blowing agent is shown as Example 1 of Table 1. Representative, non-limiting examples of inventive foam formulations using Di-Basic Esters" [DBE] are shown as Examples 2, 3, and 4 in Table. 1. In Example 2, the Di-Basic Esters" [DBE] amount is 1.5 parts per hundred parts of polyol (pphpp); in Example 3, the Di-Basic Esters" [DBE] amount is 2.0 pphpp; in Example 4, the Di-Basic Esters" [DBE] amount is 3.0 pphpp. An organic surfactant (e.g., compatibilizer of row 2 of Table 1) is used in all these examples to get some miscibility of the polyester polyol with the n-pentane.

As mentioned above, a typical prior art foam utilizing n-pentane as the only blowing agent is shown as Example 1. To provide this foam with the needed amount of heat resistance and flame-spread control, an expensive fire retardant is used at 15-parts per hundred parts of polyol (pphpp). The last two rows of Table 1 show the improved peel strength data of the invention for Examples 2, 3, and 4. The peel strength test method is discussed immediately below.

The purpose of an in-process peel strength test is to determine the facer adhesion of uncured foam boards before being wrapped and cured in a bundle. Example Equipment utilized for a typical test includes one (1) Berkley Digital Fish Scale; range 0–50 pounds, and one fixture to hold a facer sample 3-inches wide. The test procedure involves removing two (2) boards from the foam board production line (e.g., laminator line), and then placing the two removed boards on the floor with one faced down and the other faced up. The boards are allowed to cool for about five minutes. One person holds the board while another person pulls the facer that touched the floor, the facer initially being pulled back about 3-inches. This facer sample is then tightly clamped into the fixture. The digital fish-weighing scale is allowed to stabilize on zero after fixing it onto the clamp. The facer is then slowly peeled back 12-inches, noting the pounds resistance involved in the peeling.

TABLE 1

| COMPONENTS | EXAMPLE #1 PRIOR ART | EXAMPLE #2 | EXAMPLE #3 | EXAMPLE #4 |
|---|---|---|---|---|
| Stepan polyol | 100.00 | 100.00 | 100.00 | 100.00 |
| Compatibilizer | 5.00 | 5.00 | 5.00 | 5.00 |
| Fire Retardant | 15.00 | 15.00 | 15.00 | 15.00 |
| Potassium Cat. | 4.60 | 4.60 | 4.60 | 4.60 |
| Amine Catalyst | 1.00 | 1.00 | 1.00 | 1.00 |
| Silicone surfactant | 4.50 | 4.50 | 4.50 | 4.50 |
| n-pentane | 30.18 | 30.78 | 31.14 | 31.88 |
| Dibasic Esters | 0.00 | 1.50 | 2.00 | 3.00 |
| Polymeric MDI | 226.51 | 227.42 | 228.11 | 229.06 |
| Peel Test Results: | | | | |
| on GRF Facer | 0.523 | 1.240 | 1.315 | 1.571 |
| on Coated Glass | 0.396 | 0.974 | N/A | N/A |

It will be noted from Table 1 (last two rows) that Examples 2, 3 and 4 have improved peel-strength data of the invention. The present invention thus, in one of its aspects, encompasses utilizing Di-Basic Esters [DBE] (e.g., a mixture of the methyl esters of glutaric, succinic, and adipic acid) in a foam core of a laminated foam board in a manner to provide a peel strength resistance (for facers of the board) greater than 1.00 pound (e.g., choosing an amount of the mixture to provide a peel strength resistance for the facers of greater than 1.0 pound).

With the dual-reaction technology taught in US Pat. Nos. 5,252,625, 5,254,600, and 5,294,647 (all incorporated herein by reference), it is possible for the person skilled in the art of thermosetting foam to utilize various blends of catalysts to achieve satisfactory results with n-pentane and Di-Basic Esters. Additionally, utilizing the selected azeotropes taught in U.S. Pat. No. 5,166,182, it is possible to use suitable mixtures of blowing agents from the list of EPA's Acceptable Substitutes. Certain lower cost compounds can be used as co-expansion agents, those compounds including the "Saturated Light Hydrocarbons C3–C6". These compounds are propane, isobutane, n-butane, isopentane, n-pentane, cyclopentane, and the various isomers of hexane. Miscellaneous expansion agents useful to this invention are $CO_2$, Exxsol Blowing Agents, water, Formic Acid, and selected azeotropes as taught in U.S. Pat. No. 5,166,182. Both water and Formic Acid react with an isocyanate to create $CO_2$ as the expansion agent.

Any mixture of a sufficient urethane or polyiso foam blend ratio, and one which works well with a favorable surfactant package and a suitable catalyst package can make use of the present invention.

It has been advantageously discovered that DBE improves the surface adhesion of thermosetting foams, particularly polyurethane modified polyisocyanurate foams using n-pentane. Thus it has been discovered that DBE serves a purpose which had heretofore been unknown.

Although not wishing to be bound by any particular theory, the applicants believe that the addition of DBE helps facer adhesion with any foam utilizing one or more of the EPA approved Saturated Light Hydrocarbons C3–C6.

The present invention thus advantageously employs a very low cost blowing agent, n-pentane, and uses a minimum amount of a common blend of cleaning chemicals to improve facer adhesion. This common blend of cleaning chemicals surprisingly enhance the adhesion between the foam and the facer, as evidenced by good results in either peel tests or straight-away pull testing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laminated foam board comprising:
   a closed-cell foam core formed from a polyurethane modified polyisocyanurate foam formulation including a mixture of the methyl esters of glutaric, succinic, and adipic acid;
   two facers disposed on opposing board flat surface of the foam core, each of the two facers being one of a glass reinforced facer and a coated glass facer;
   the bonding strengths of each of the facers to the foam core being greater than had the mixture not been added to the foam formulation.

2. The article of claim 1, wherein said mixture comprises methyl esters of about 59% glutaric acid, about 20% succinic acid, and about 21% adipic acid.

3. The article of claim 1, wherein the foam formulation comprises a polyol and an organic polyisocyanate, and wherein said mixture is added at an add-on rate within the rage of about 0.5 to about 5.0 parts per hundred of polyol (pphpp).

4. The article of claim 3, wherein said mixture is added at an add-on rate within the range of from about 1.0 to about 3.0 pphpp.

5. The article of claim 1, wherein the foam core is blown with an expansion agent which included n-pentane.

6. The article of claim 1, wherein the foam core is formed with an amount of the mixture whereby a peel strength resistance for the facers is greater than 1.0 pound.

7. A laminated polyurethane modified polyisocyanurate foam board comprising:
   a closed-cell foam core formed from a foam formulation which includes (1) a mixture of the methyl esters of glutaric, succinic, and adipic acid, and (2) n-pentane as an expansion agent;

two facers adhered to opposing broad flat surfaces of the foam core, each of the two facers being one of a glass reinforced facer and a coated glass facer;

the amount of the mixture included in the foam formulation being chosen to enhance adhesion of the facers to the foam core.

8. The article of claim 7 wherein said mixture comprises methyl esters of about 59% glutaric acid, about 20% succinic acid, and about 21% adipic acid.

9. The article of claim 7 wherein the foam comprises a polyol and an organic polyisocyanate, and wherein said mixture is added at an add-on rate within the range of about 0.5 to about 5.0 parts per hundred of polyol (pphpp).

10. The article of claim 7 wherein said mixture is added at an add-on rate within the range of from about 1.0 to about 3.0 pphpp.

11. The article of claim 7 wherein the amount of the mixture utilized is chosen to provide a peel strength resistance for the facers of greater than 1.0 pound.

* * * * *